US009785816B1

(12) United States Patent
Lin et al.

(10) Patent No.: US 9,785,816 B1
(45) Date of Patent: Oct. 10, 2017

(54) BARCODE DECODING METHOD

(71) Applicant: Qisda Corporation, Taoyuan (TW)

(72) Inventors: Chi-Cheng Lin, Taoyuan (TW);
Min-Hsiung Huang, New Taipei (TW);
Chuang-Wei Wu, Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 15/462,914

(22) Filed: Mar. 20, 2017

(30) Foreign Application Priority Data

Mar. 24, 2016  (TW) .............................. 105109126 A

(51) Int. Cl.
*G06K 7/14* (2006.01)
*G06K 7/10* (2006.01)
*G06K 19/06* (2006.01)

(52) U.S. Cl.
CPC ....... *G06K 7/1447* (2013.01); *G06K 7/10722* (2013.01); *G06K 7/10792* (2013.01); *G06K 7/1413* (2013.01); *G06K 19/0614* (2013.01); *G06K 19/06028* (2013.01)

(58) Field of Classification Search
CPC .................................................. G06K 7/1447

USPC ........... 235/462.04, 462.24, 462.45, 462.46, 235/462.02, 454
See application file for complete search history.

(56) References Cited

U.S. PATENT DOCUMENTS

| 5,489,769 A * | 2/1996 | Kubo ................... G06K 7/1456 235/462.09 |
| 9,495,571 B1 * | 11/2016 | Xiao ................... G06K 7/10722 |
| 2010/0200660 A1 * | 8/2010 | Moed ...................... G06K 7/14 235/470 |

* cited by examiner

*Primary Examiner* — Allyson Trail

(57) ABSTRACT

A barcode decoding method includes steps of analyzing a relative relationship between at least two characteristic points of a gray level distribution of a target scanning line of a target barcode to obtain at least one reference characteristic parameter; when determining a current distance between a barcode reader and the target barcode being a relatively long distance, dividing the gray level distribution into at least one bar area and at least one space area; setting a gray level region and locating at least one peak point and/or at least one valley point located within the gray level region from the gray level distribution; when the peak point is located within the bar area, interpolating a space corresponding to the peak point into the bar area; and when the valley point is located within the space area, interpolating a bar corresponding to the valley point into the space area.

9 Claims, 13 Drawing Sheets

BARCODE DECODING METHOD

BACKGROUND OF THE INVENTION

1. Field of the Invention

The present invention relates to a barcode decoding method, and more particularly, to a barcode decoding method for effectively increasing decoding success rate.

2. Description of the Prior Art

A barcode is a figurate identification code composed of a plurality of parallel black stripes with different widths and arranged according to a specific encoding rule to present certain messages. Since a barcode can be used to identify a product's manufacturing country, manufacturer's name, product's name, manufacturing date, book category number and sender's and recipient's mailing addresses, etc., it is therefore widely applied in many fields.

When the barcode is read by the barcode reader, the minimum width of the stripe and the space in the barcode that can be decoded by the barcode reader is affected by the depth of field, the pixel resolution of the image sensor, the characteristics of the optical lens and so on. The width of the stripe and the space in the barcode read by the barcode reader decreases with the increase in distance between the barcode and the barcode reader. Under such circumstance, the barcode image captured by the barcode reader far away from the barcode would be vague. This causes decoding problems especially when the barcode reader is not incorporated with a zoom lens.

SUMMARY OF THE INVENTION

One of the purposes of the present invention is to provide a barcode decoding method for effectively increasing decoding success rate to solve the aforementioned problems.

According to one embodiment of the present invention, the barcode decoding method includes the steps of: capturing a target image of a target barcode by a barcode reader; setting a target scanning line on the target image; analyzing a relative relationship between at least two characteristic points of a gray level distribution of the target scanning line to obtain at least one reference characteristic parameter; determining a current distance between the barcode reader and the target barcode being a relatively long distance when the at least one reference characteristic parameter fits to at least one first predetermined characteristic parameter; dividing the gray level distribution of the target scanning line into at least one bar area and at least one space area according to a predetermined gray level when the current distance is the relatively long distance; setting a gray level region according to the predetermined gray level and locating at least one peak point and/or at least one valley point located within the gray level region from the gray level distribution of the target scanning line; interpolating a space corresponding to the peak point into the bar area when the peak point is located within the bar area; and interpolating a bar corresponding to the valley point into the space area when the valley point is located within the space area.

In sum, in the embodiments of the present invention when it is determined that the current distance between the barcode reader and the target barcode is the relatively long distance, the gray level distribution of the target scanning line is divided into at least one bar area and at least one space area. Thereafter, a space is interpolated into the bar area when the corresponding peak point within the gray level region is located within the bar area, and a bar is interpolated into the space area when the corresponding valley point within the gray level region is located within the space area, so as to recover the missing or vague bars or spaces in the target image of the target barcode. By such, the decoding success rate is increased when the current distance between the barcode reader and the target barcode is the relatively long distance.

The above-mentioned and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

Figure 1:
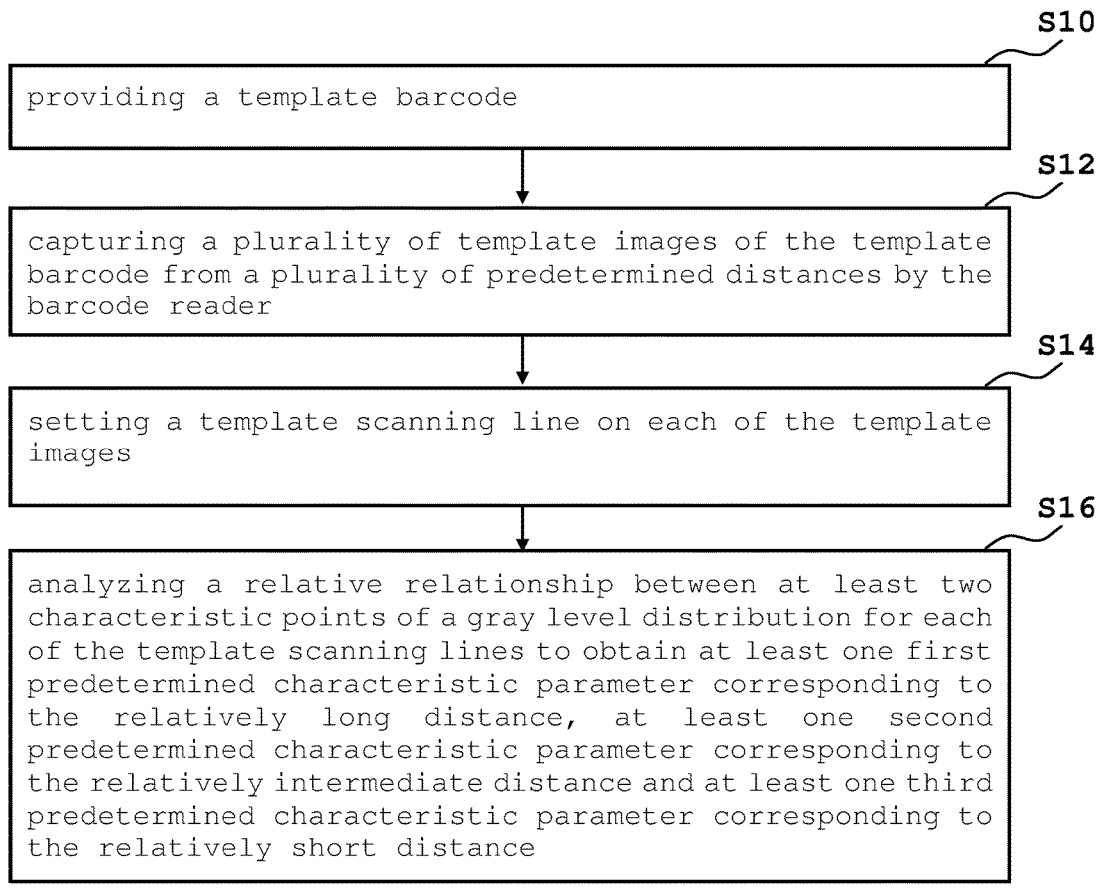
FIG. 1 is a flowchart showing the method of establishing a look-up table including correspondence between the characteristic parameters of a barcode image and the relative distances according to an embodiment of the present invention.
Figure 2:
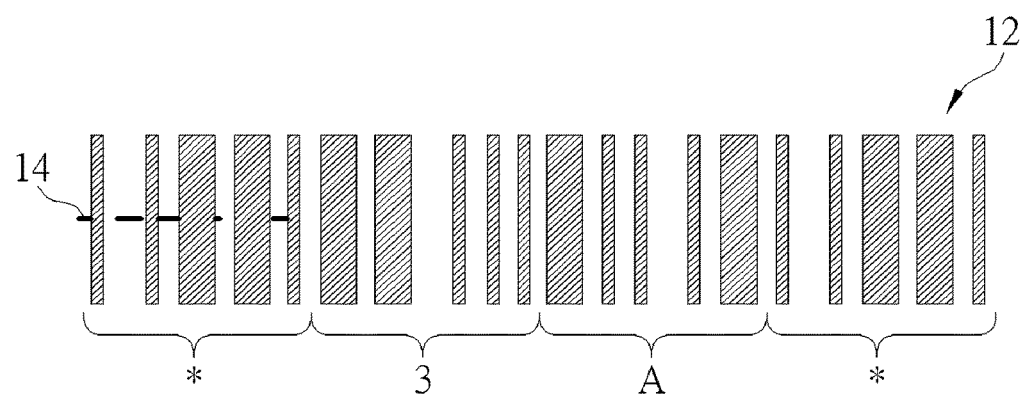
FIG. 2 is a schematic diagram of a barcode reader and a template barcode.
Figure 2:
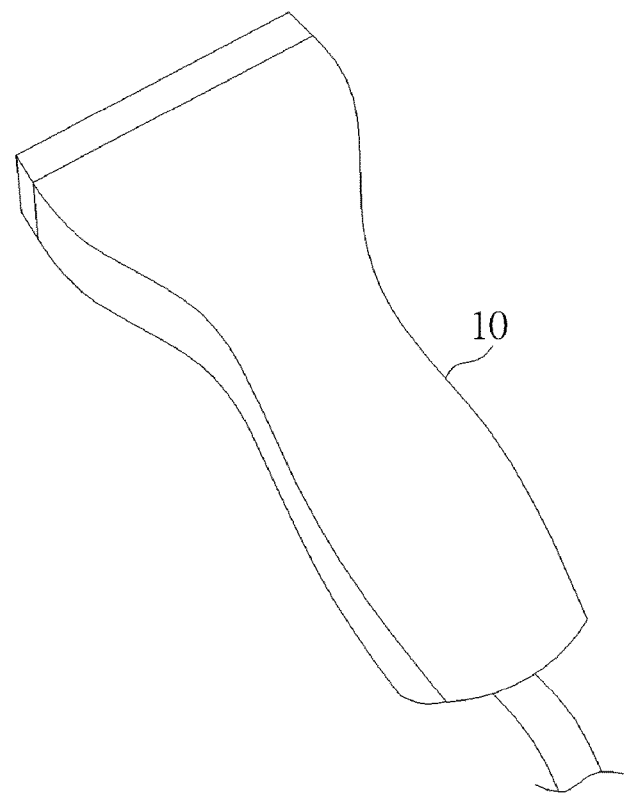
Figure 3:
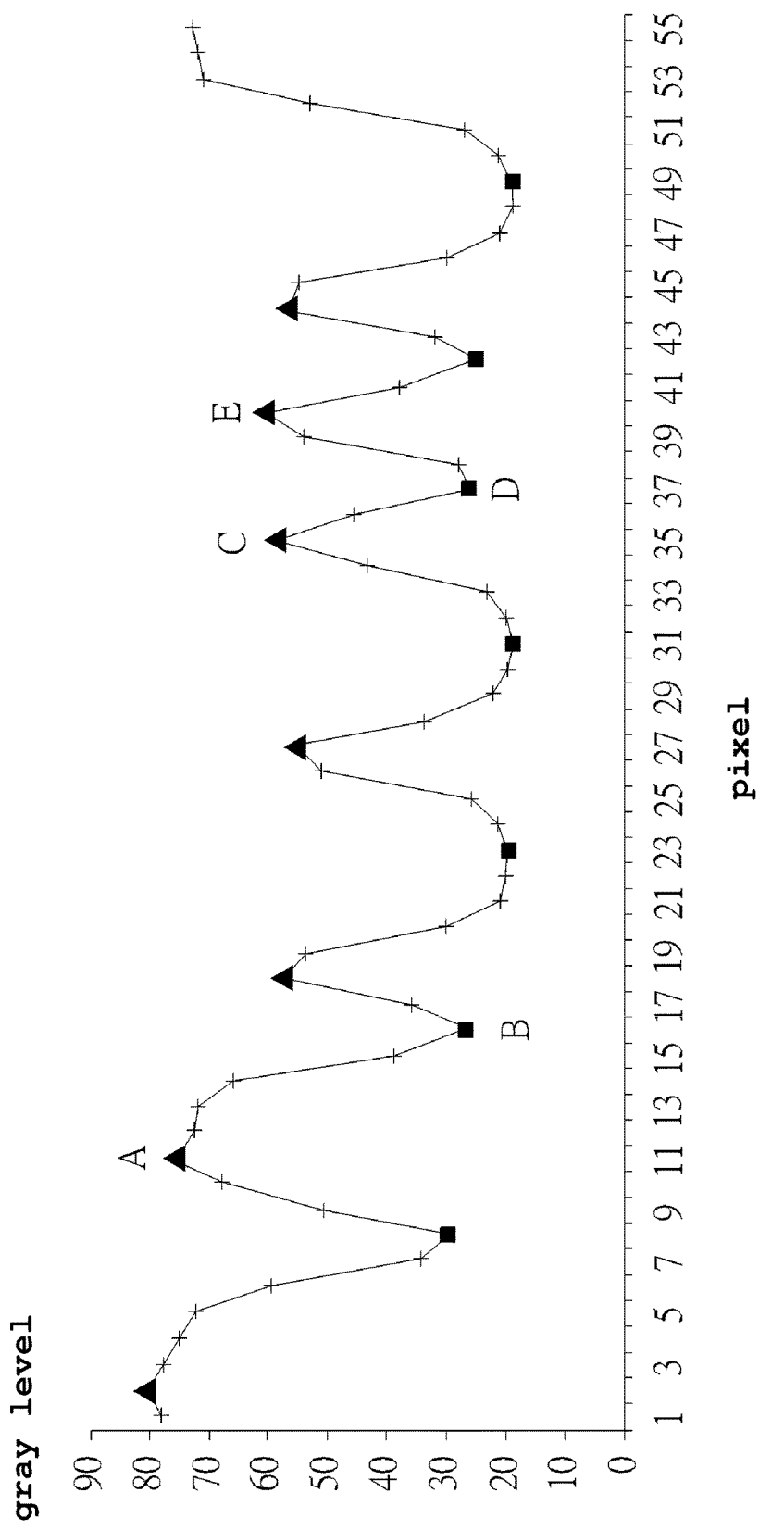
FIG. 3 is a schematic diagram of a gray level distribution of a template scanning line of a template image of the template barcode when the predetermined distance between the barcode reader and the template barcode is the relatively intermediate distance.
Figure 4:
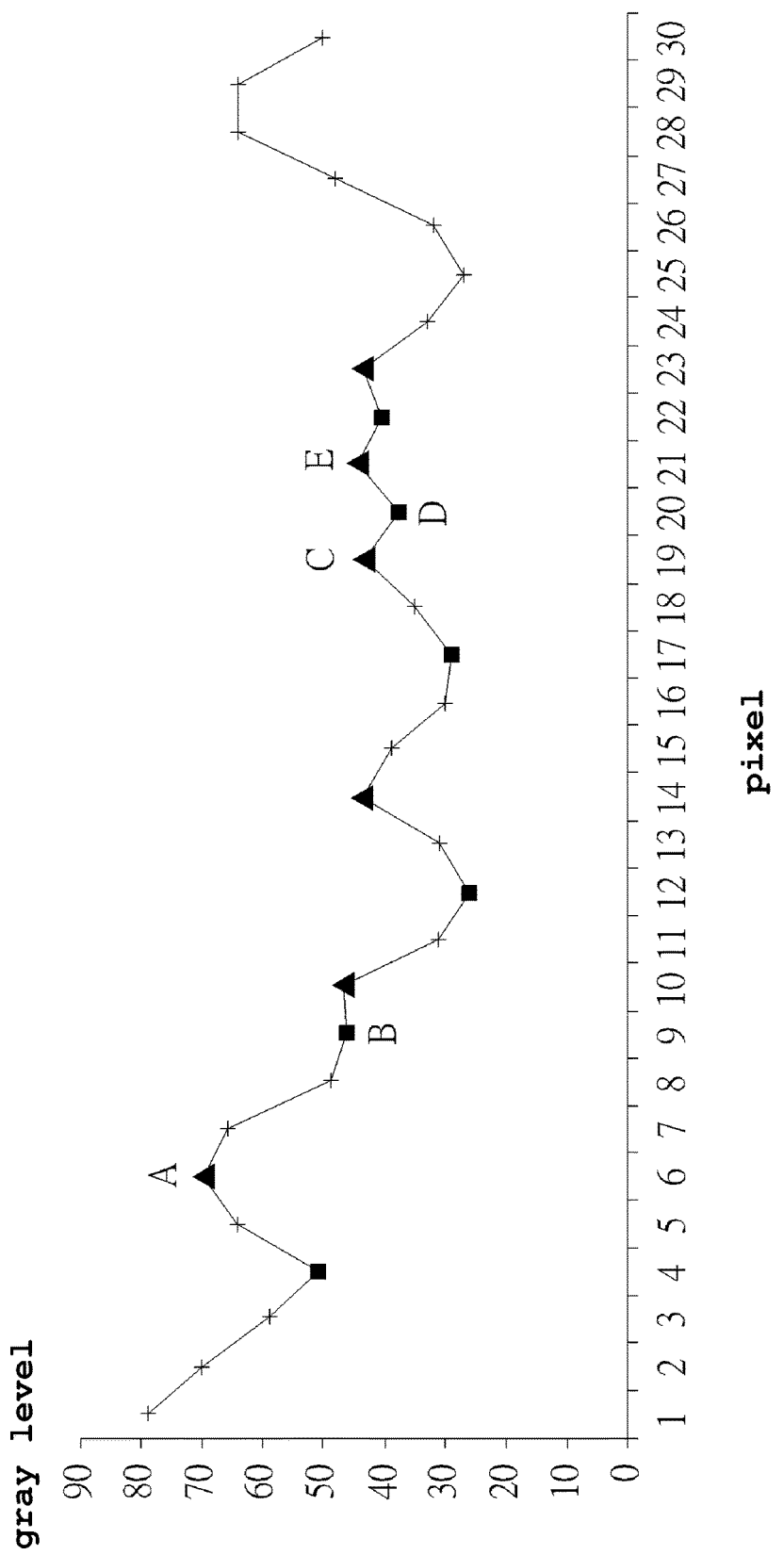
FIG. 4 is a schematic diagram of a gray level distribution of a template scanning line of a template image of the template barcode when the predetermined distance between the barcode reader and the template barcode is the relatively long distance.
Figure 5:
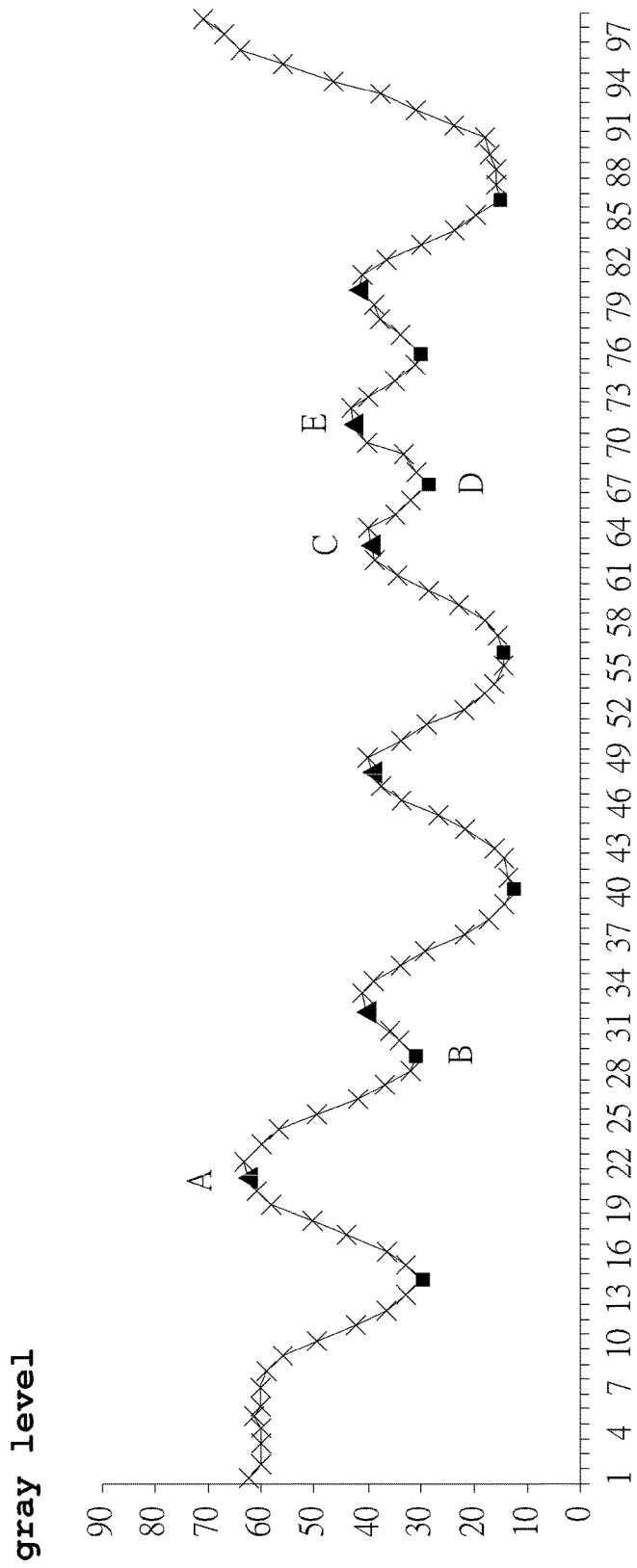
FIG. 5 is a schematic diagram of a gray level distribution of a template scanning line of a template image of the template barcode when the predetermined distance between the barcode reader and the template barcode is the relatively short distance.

Please refer to FIG. 1 through FIG. 5. FIG. 1 is a flowchart showing the method of establishing a look-up table including correspondence between the characteristic parameters of a barcode image and the relative distances according to an embodiment of the present invention. FIG. 2 is a schematic diagram of a barcode reader 10 and a template barcode 12. FIG. 3 is a schematic diagram of a gray level distribution of a template scanning line of a template image of the template barcode 12 when the predetermined distance between the barcode reader 10 and the template barcode 12 is the relatively intermediate distance. FIG. 4 is a schematic diagram of a gray level distribution of a template scanning line of a template image of the template barcode 12 when the predetermined distance between the barcode reader 10 and the template barcode 12 is the relatively long distance. FIG. 5 is a schematic diagram of a gray level distribution of a template scanning line of a template image of the template barcode 12 when the predetermined distance between the barcode reader 10 and the template barcode 12 is the relatively short distance.

In the present invention an image of the template barcode 12 is captured by the barcode reader 10, and the relative distance between the barcode reader 10 and the template barcode 12 is estimated so as to provide the barcode reader 10 not having a zoom lens with the relation distance information required for decoding. The decoding success rate is thus increased. Before decoding a barcode, in the present invention a look-up table including correspondence between the characteristic parameters of a barcode image and the relative distances needs to be established first.

Step S10 is first executed to provide a template barcode 12. According to an embodiment of the present invention the template barcode 12 complies with a specific coding rule. As shown in FIG. 2, the template barcode 12 complies with the coding rule Code 39. After the template barcode 12 is decoded, the code "*3A*" is obtained. Since the template barcode 12 starts and ends with the character "*", it is used to establish the look-up table including correspondence between the characteristic parameters of the barcode image and the relative distances. It is to be understood that another coding rule other than the coding rule Code 39 may be chosen to implement the present invention according to practical applications, and the invention is not so limited.

Thereafter, step S12 is executed to capture a plurality of template images of the template barcode 12 from a plurality of predetermined distances by the barcode reader 10. The plurality of predetermined distances include the relatively long distance, the relatively intermediate distance and the relatively short distance.

Thereafter, step S14 is executed to set a template scanning line 14 on each of the template images. The template scanning line 14 is a horizontal line on the template image as shown in FIG. 2.

Thereafter, step S16 is executed to analyze a relative relationship between at least two characteristic points of a gray level distribution for each of the template scanning lines 14 to obtain at least one first predetermined characteristic parameter corresponding to the relatively long distance, at least one second predetermined characteristic parameter corresponding to the relative intermediate distance and at least one third predetermined characteristic parameter corresponding to the relatively short distance.

In the embodiment of the present invention, FIG. 3 shows a gray level distribution of the template scanning line 14 of the template image of the template barcode 12 when the predetermined distance between the barcode reader 10 and the template barcode 12 is the relatively intermediate distance. FIG. 4 is shows a gray level distribution of the template scanning line 14 of the template image of the template barcode 12 when the predetermined distance between the barcode reader 10 and the template barcode 12 is the relatively long distance. FIG. 5 shows a gray level distribution of the template scanning line 14 of the template image of the template barcode 12 when the predetermined distance between the barcode reader 10 and the template barcode 12 is the relatively short distance. The triangles and the rectangles shown in FIG. 3 through FIG. 5 represent the peak points and the valley points, respectively, of the gray level distribution.

In the embodiment as shown in FIG. 3 through FIG. 5, the peak point A and its adjacent valley point B, the peak point C and its adjacent peak point E as well as the valley point D and its adjacent peak point E are chosen to be the characteristic points for analysis. It is to be understood that in the present invention any two adjacent peak point and valley point, any two adjacent peak points, any two adjacent valley pints or the combination thereof may be chosen to be the characteristic points for analysis. The present invention is not limited to what is shown in FIG. 3 through FIG. 5.

For example, the relatively intermediate distance is defined as 7 centimeters between the barcode reader 10 and the template barcode 12. The gray level distribution of the template scanning line 14 of the template image of the template barcode 12 shown in FIG. 3 is obtained under such a relatively intermediate distance. The pixel distance between the peak point A and its adjacent valley point B is 5 pixels, the pixel distance between the peak point C and its adjacent peak point E is 5 pixels, and the gray level difference between the valley point D and its adjacent peak point E is 35. Moreover, the relatively long distance is defined as 13 centimeters between the barcode reader 10 and the template barcode 12. The gray level distribution of the template scanning line 14 of the template image of the template barcode 12 shown in FIG. 4 is obtained under such a relatively long distance. The pixel distance between the peak point A and its adjacent valley point B is 3 pixels, the pixel distance between the peak point C and its adjacent peak point E is 1 pixel, and the gray level difference between the valley point D and its adjacent peak point E is 7. The relatively short distance is defined as 4 centimeters between the barcode reader 10 and the template barcode 12. The gray level distribution of the template scanning line 14 of the template image of the template barcode 12 shown in FIG. 5 is obtained under such a relatively short distance. The pixel distance between the peak point A and its adjacent valley point B is 8 pixels, the pixel distance between the peak point C and its adjacent peak point E is 7 pixels, and the gray level difference between the valley point D and its adjacent peak point E is 14. It is to be understood that the pixel distance between two characteristic points, the gray level difference between two characteristic points or the combination thereof may be chosen to be the relative relationship between two characteristic points according to practical applications, and the present invention is not so limited.

After a plurality of template images of the template barcode 12 at a plurality of predetermined distances are captured by the barcode reader 10 and each of the gray level distribution of the template scanning line 14 for each template image is analyzed, a look-up table including correspondence between the characteristic parameters of the barcode image and the relative distances is established as shown in Table 1 below.

TABLE 1 look-up table including correspondence between the characteristic parameters of the barcode image and the relative distances

| predetermined characteristic parameters | pixel distance between peak point A and its adjacent | pixel distance between peak point C and its adjacent | gray level difference between valley point D and its | relative distance |
| --- | --- | --- | --- | --- |

TABLE 1-continued look-up table including correspondence between the characteristic
parameters of the barcode image and the relative distances

| | valley point B (Da-b) | peak point E (Dc-e) | adjacent peak point E (Cd-e) | |
|---|---|---|---|---|
| third predetermined characteristic parameters | Da-b > 7 | Dc-e > 4 | 9 ≤ Cd-e ≤ 20 | relatively short distance |
| second predetermined characteristic parameters | 4 ≤ Da-b ≤ 7 | 2 < Dc-e ≤ 4 | Cd-e > 20 | relatively intermediate distance |
| first predetermined characteristic parameters | Da-b < 4 | Dc-e ≤ 2 | Cd-e < 9 | relatively long distance |

Figure 6A:
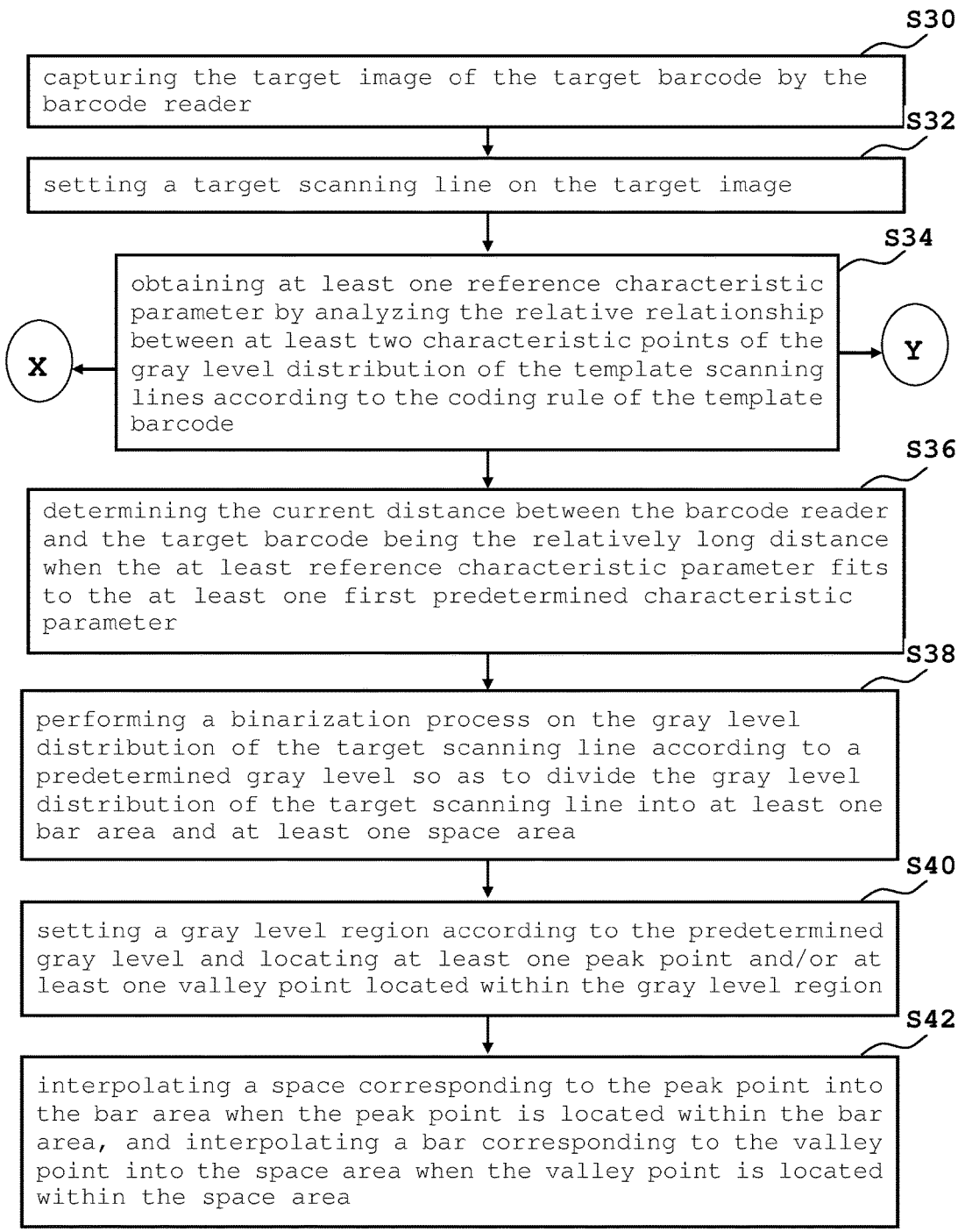
FIG. 6A through FIG. 6C are the flowcharts showing the barcode decoding method according to an embodiment of the present invention.
Figure 6B:
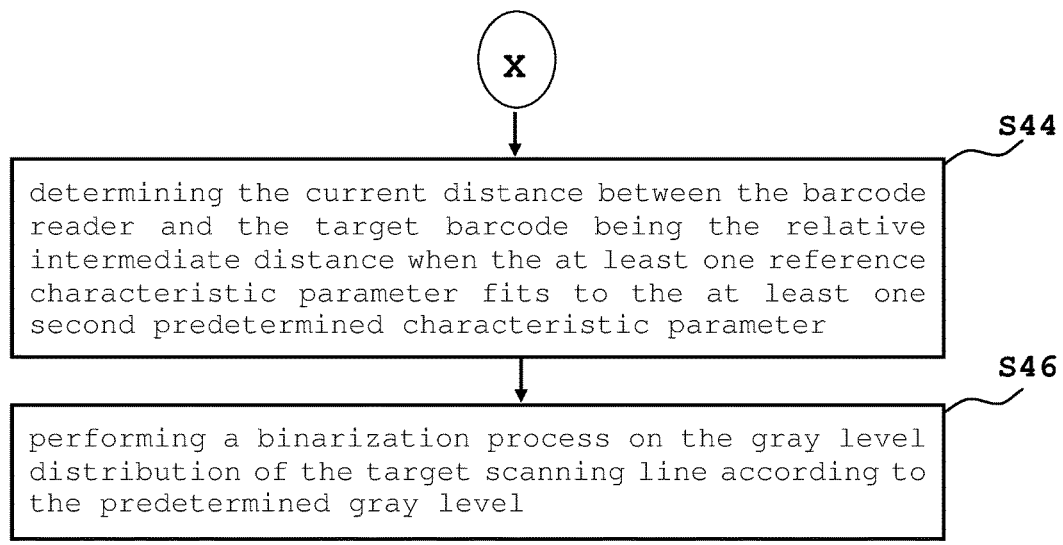
Figure 6C:
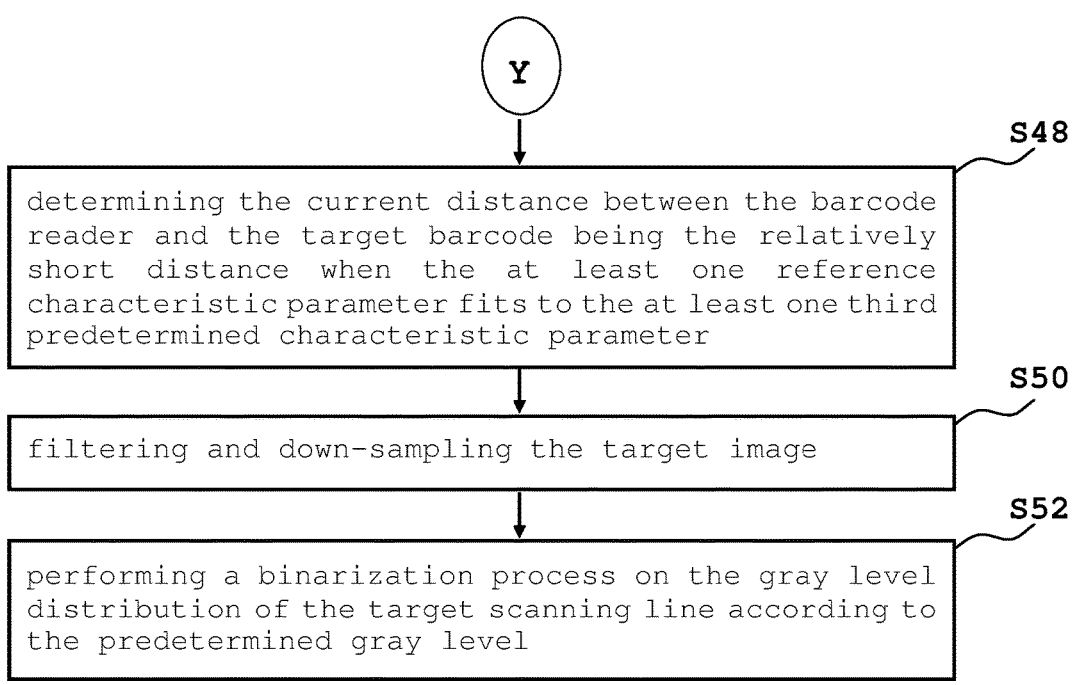
Figure 7:
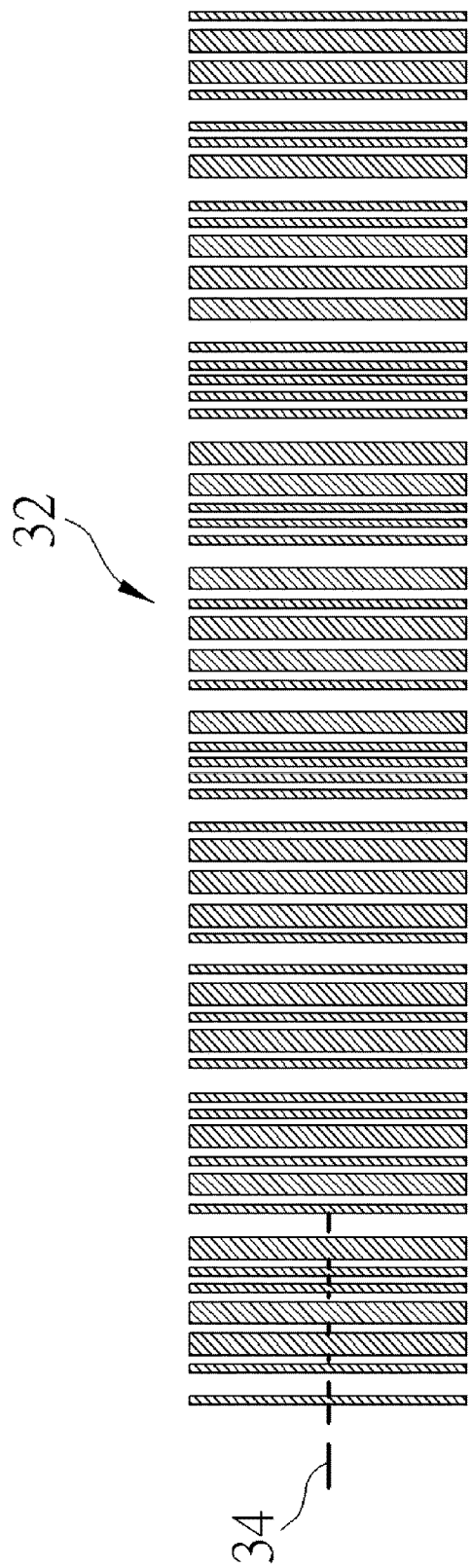
FIG. 7 is a schematic diagram of a target barcode.
Figure 8:
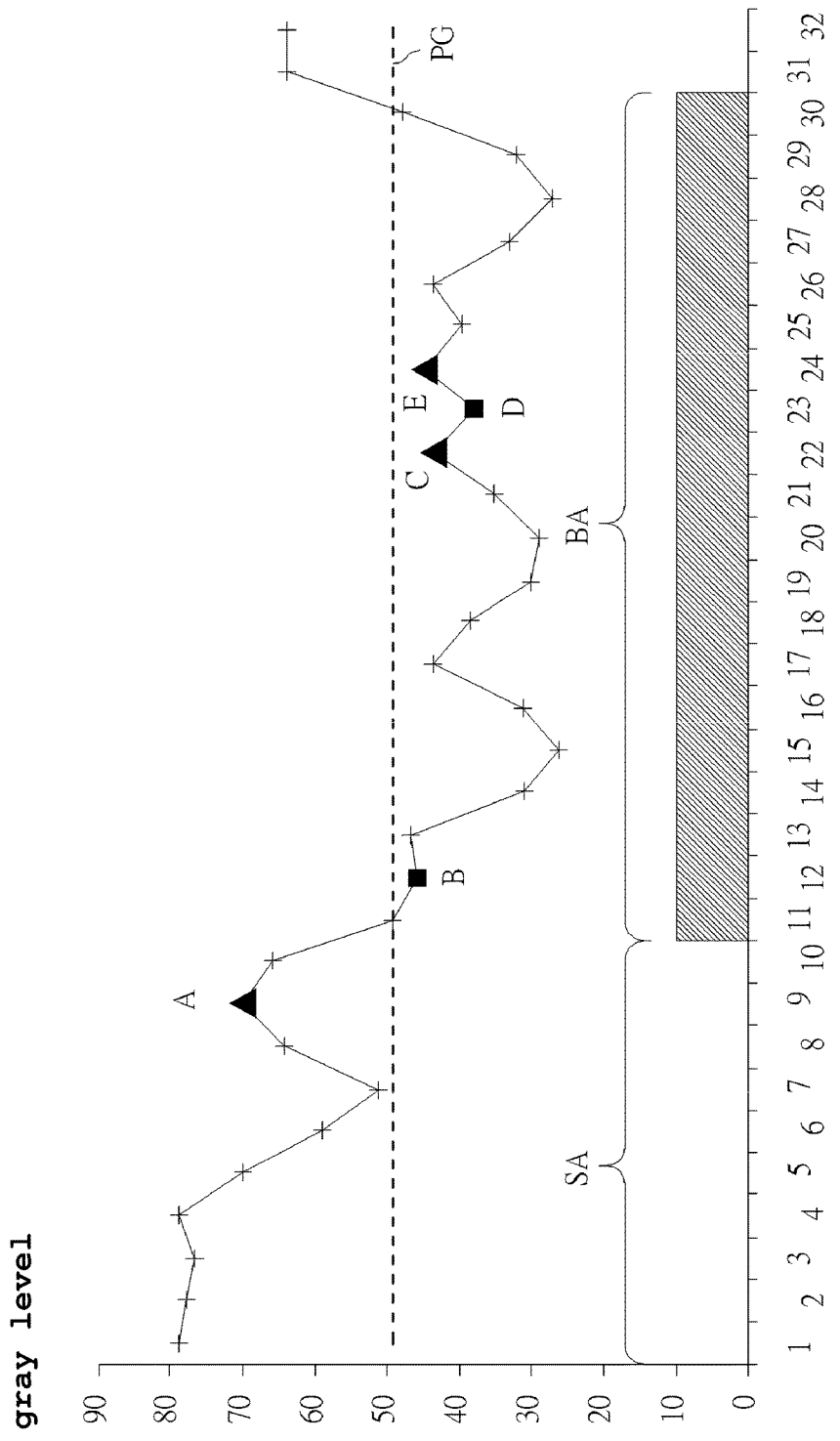
FIG. 8 is a schematic diagram of a gray level distribution of a target scanning line of a target image of the target barcode, wherein the gray level distribution of the target scanning line is divided into a bar area and a space area.
Figure 9:
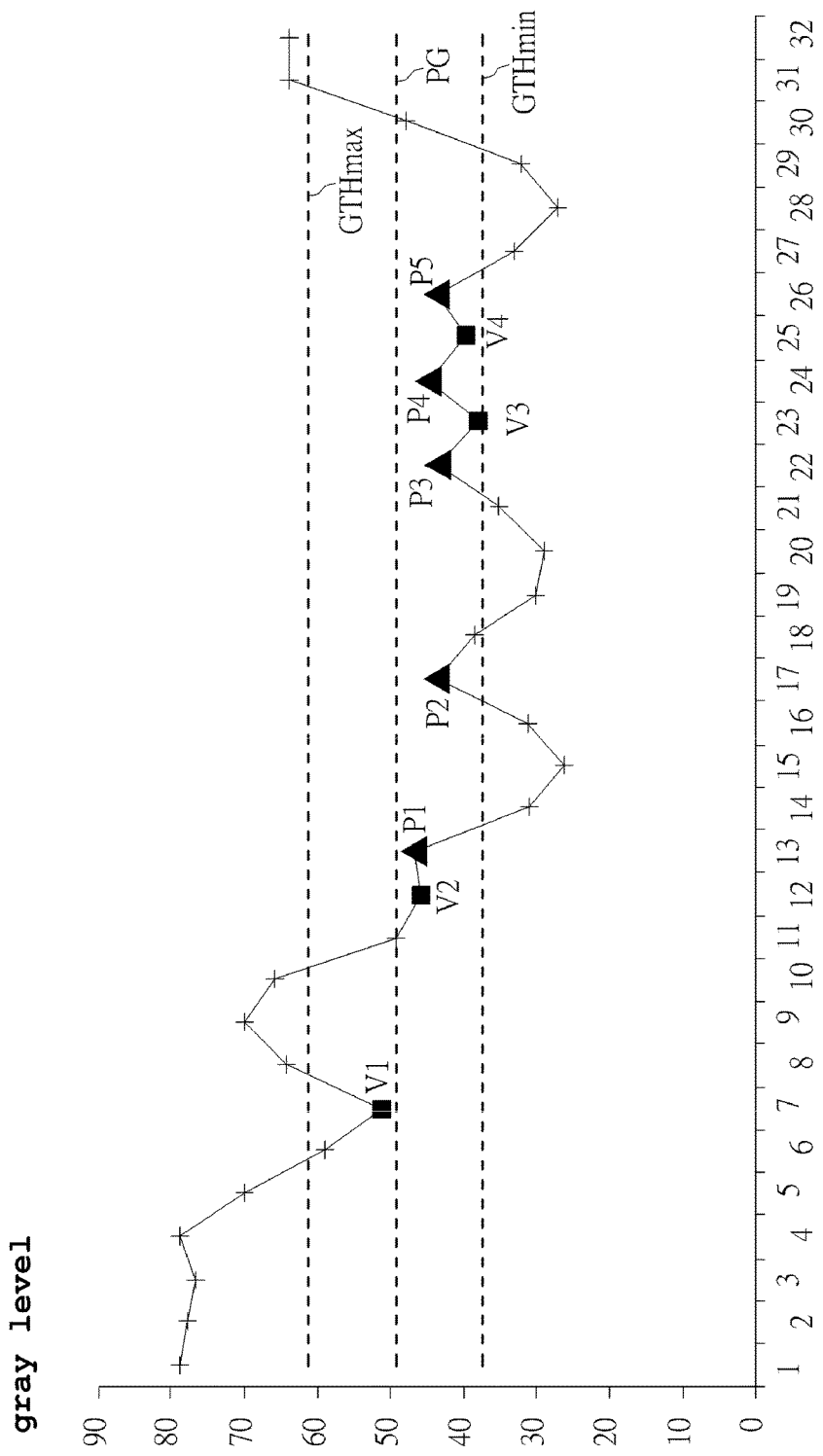
FIG. 9 is a schematic diagram of the peak points and the valley points located within the gray level region from the gray level distribution of the target scanning line.
Figure 10:
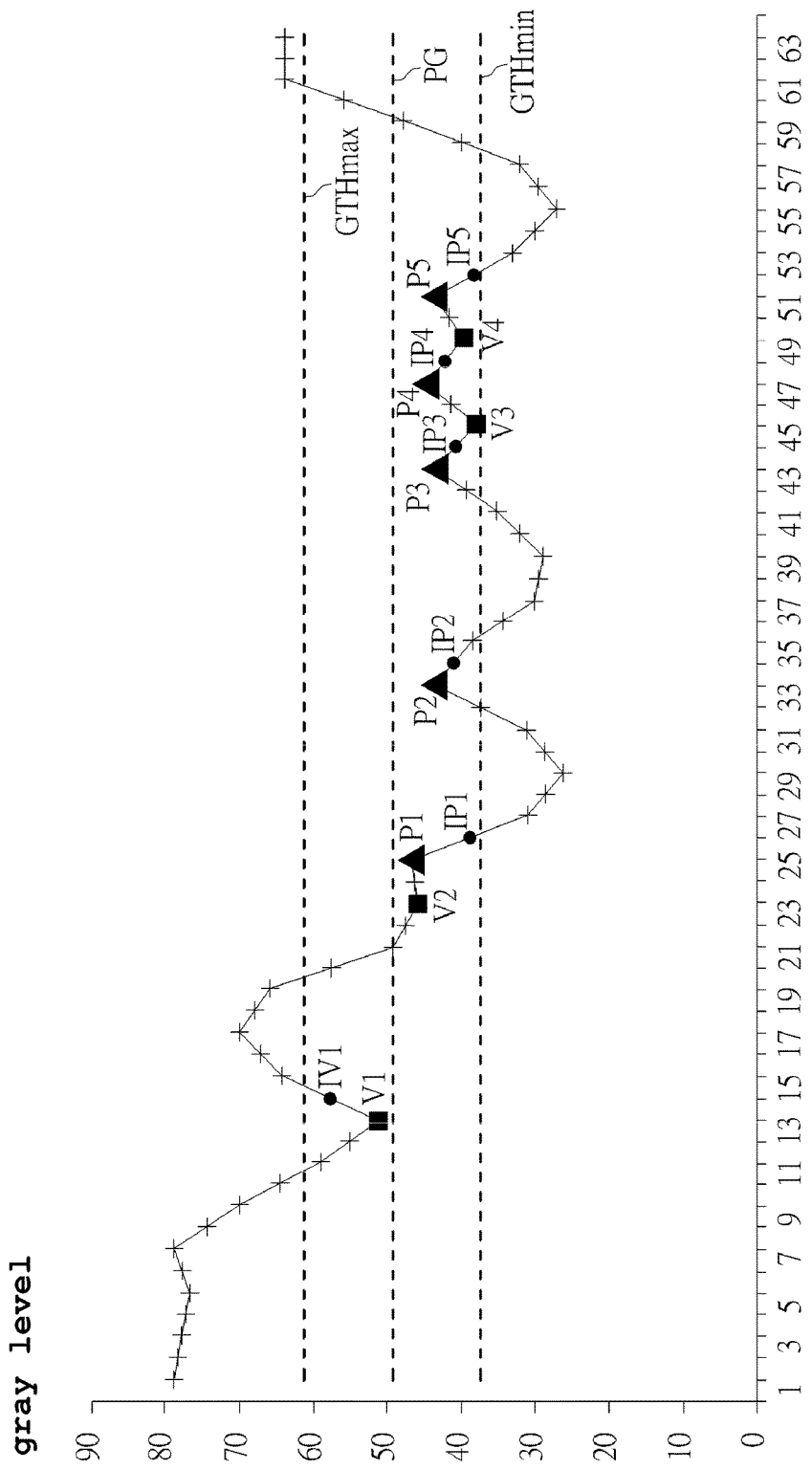
FIG. 10 is a schematic diagram of the interpolation points interpolated between every two adjacent pixels for the gray level distribution of the target scanning line.
Figure 11:
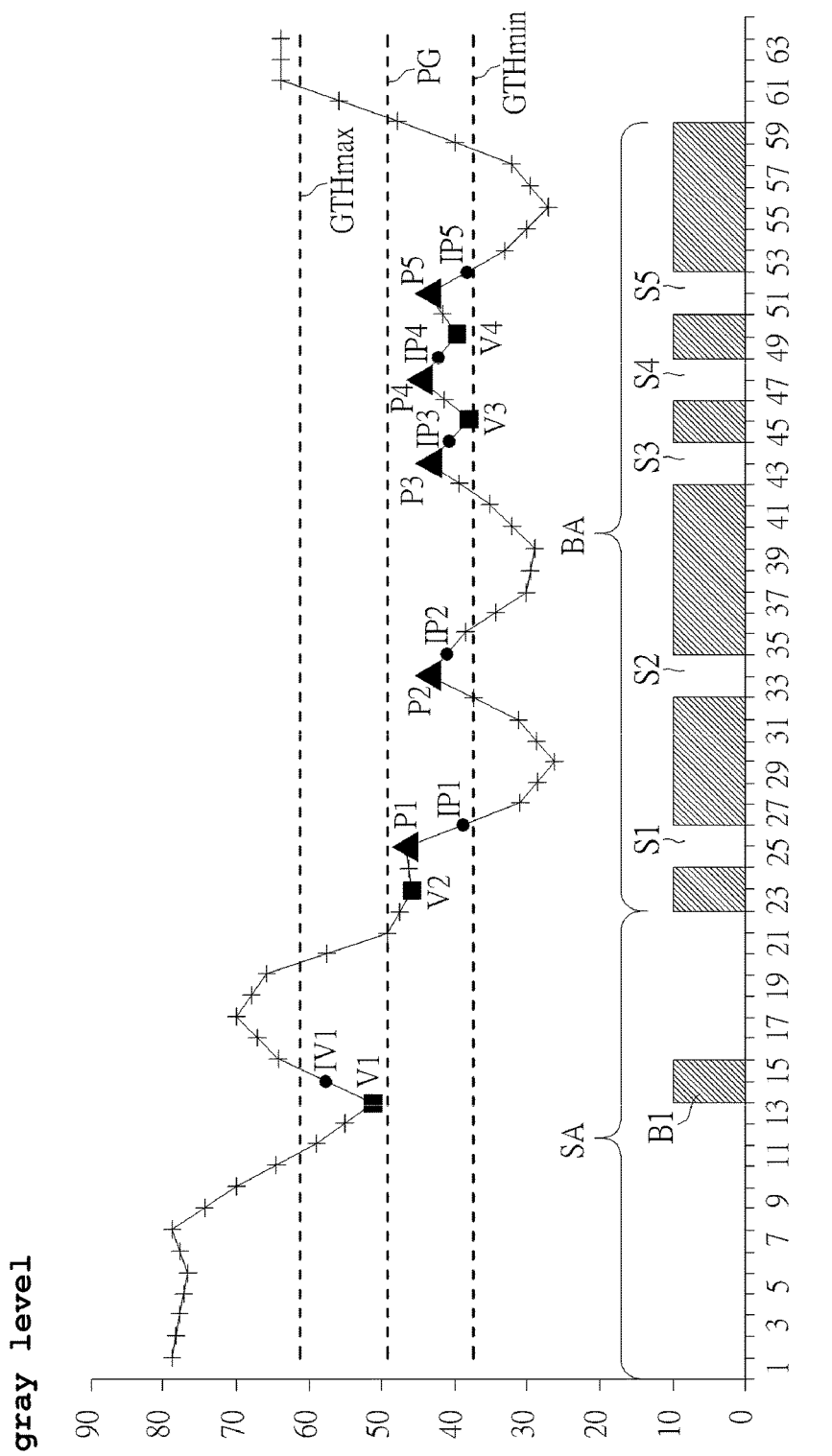
FIG. 11 is a schematic diagram of five spaces interpolated into the bar area and one bar interpolated into the space area.

Please refer to FIG. 6A through FIG. 12. FIG. 6A through FIG. 6C are the flowcharts showing the barcode decoding method according to an embodiment of the present invention. FIG. 7 is a schematic diagram of a target barcode 32. FIG. 8 is a schematic diagram of a gray level distribution of a target scanning line 34 of a target image of the target barcode 32 wherein the gray level distribution of the target scanning line 34 is divided into a bar area BA and a space area SA. FIG. 9 is a schematic diagram of the peak points P1-P5 and the valley points V1-V4 located within the gray level region GTHmax-GTHmin from the gray level distribution of the target scanning line. FIG. 10 is a schematic diagram of the interpolation points interpolated between every two adjacent pixels for the gray level distribution of the target scanning line 34. FIG. 11 is a schematic diagram of five spaces S1-S5 corresponding to the peak points P1-P5 interpolated into the bar area BA and one bar B1 corresponding to the valley point V1 interpolated into the space area SA.

After the look-up table including correspondence between the characteristic parameters of the barcode image and the relative distances is established as shown in Table 1 above, the target barcode 32 shown in FIG. 7 is then decoded according to Table 1. It is to be understood that since Table 1 is established according the coding rule Code 39, the target barcode 32 has to comply with the coding rule Code 39 as well. In other words, the target barcode 32 and Table 1 are subject to the same coding rule.

Step S30 is executed to capture the target image of the target barcode 32 by the barcode reader 10. Step S32 is then executed to set a target scanning line 34 on the target image as shown in FIG. 7. Step S34 is executed to analyze the relative relationship between at least two characteristic points of the gray level distribution of the target scanning lines 34 according to the coding rule of target barcode 32 to obtain at least one reference characteristic parameter. Since Table 1 is established by choosing the peak point A and its adjacent valley point B, the peak point C and its adjacent peak point E as well as the valley point D and its adjacent peak point E shown in FIG. 3 through FIG. 5 as the characteristic points, the embodiment of the present invention may perform a similar process to obtain three reference characteristic parameters of the target barcode 32, i.e. the pixel distance between the peak point A and its adjacent valley point B, the pixel distance between the peak point C and its adjacent peak point E as well as the gray level difference between the valley point D and its adjacent peak point E as shown in FIG. 8.

The current distance between the barcode reader 10 and the target barcode 32 can be determined based on the characteristic parameters obtained in Step S34 and Table 1. When the at least reference characteristic parameter obtained in Step S34 fits to the at least one first predetermined characteristic parameter of Table 1, Step S36 is executed to determine that the current distance between the barcode reader 10 and the target barcode 32 is the relatively long distance.

When it is determined that the current distance between the barcode reader 10 and the target barcode 32 is the relatively long distance, Step S38 is executed to perform a binarization process on the gray level distribution of the target scanning line 34 according to a predetermined gray level PG so as to divide the gray level distribution of the target scanning line 34 into at least one bar area and at least one space area. As shown in FIG. 8, the gray level distribution of the target scanning line 34 is divided into a bar area BA and a space area SA. It is to be understood that the gray level distribution may be divided into a plurality of bar areas BA and/or space areas SA according to reading results of different barcodes. In the embodiment of the present invention an averaged gray level of the gray level distribution of the target scanning line 34 is used as the predetermined gray level PG, but the present invention is not so limited. The predetermined gray level PG may be determined in different ways according to practical applications.

Step S40 is then executed to set a gray level region GTHmax-GTHmin according to the predetermined gray level and to locate the peak points P1-P5 and the valley points V1-V4 located within the gray level region GTHmax-GTHmin from the gray level distribution of the target scanning line 34. In the embodiment the upper bound and the lower bound of the gray level region GTHmax-GTHmin is determined by increasing and decreasing the predetermined gray level PG by a predetermined ratio, such as 25%, respectively. As shown in FIG. 9, five peak points P1-P5 and four valley points V1-V4 are located within the gray level region GTHmax-GTHmin. It is to be understood that there may be one or more peak points and/or one or more valley points based on reading result of different barcodes and different predetermined gray levels PG, and the present invention is not limited to what is shown in FIG. 9.

Thereafter, whether the peak points P1-P5 are located within the bar area BA and whether the valley points V1-V4 are located within the space area SA are determined. Step S42 is then executed to interpolate a space corresponding to each of the peak points P1-P5 into the bar area BA when the peak point(s) P1-P5 is/are located within the bar area, and to interpolate a bar corresponding to each of the valley points V1-V4 into the space area SA when the valley point(s) is/are located within the space area.

In the embodiment of the present invention an interpolation point is interpolated between every two adjacent pixels for the gray level distribution of the target scanning line 34. The number of pixels for the gray level distribution of the target scanning line 34 is thus increased from 32 to 63 as shown in FIG. 9. Assuming that x[n] and x[n+1] represent the gray levels of two adjacent pixels and x[n+0.5] represents the gray level of the interpolation point, x[n+0.5] may be obtained according to Formula 1 as shown below.

$$x[n+0.5]=(x[n+1]-x[n])/2+x[n] \qquad \text{Formula 1:}$$

When a peak point is located within the bar area BA, according to the embodiment of the present invention the width of the interpolated space is the width between the peak point and the interpolating point adjacent to the peak point.

Similarly, when a valley point is located within the space area SA, the width of the interpolated bar is the width between the valley point and the interpolating point adjacent to the valley point.

As shown in FIG. 11, only one valley point V1 is located within the space area SA in the embodiment. The width between the valley point V1 and the interpolating point IV1 at the right side of and adjacent to the valley point V1 is used as the width of the interpolated bar B1, and the interpolated bar B1 is then interpolated into a point that corresponds to the valley point V1 in the space area SA. It is to be understood that the width between the valley point V1 and the interpolating point at the left side of and adjacent to the valley point V1 may also be used as the width of the interpolated bar B1 according to practical applications.

Once the spaces S1-S5 are interpolated into the bar area BA and the bar B1 is interpolated into the space area SA, the target barcode 32 is then decoded.

When the at least one reference characteristic parameter obtained in Step S34 fits to the at least one second predetermined characteristic parameter of Table 1, Step S44 is executed to determine that the current distance between the barcode reader 10 and the target barcode 32 is the relatively intermediate distance. When it is determined that the current distance between the barcode reader 10 and the target barcode 32 is the relatively intermediate distance, Step S46 is executed to perform a binarization process on the gray level distribution of the target scanning line 34 according to the predetermined gray level PG so as to decode the target barcode 32.

When the at least one reference characteristic parameter obtained in Step S34 fits to the at least one third predetermined characteristic parameter of Table 1, Step S48 is executed to determine that the current distance between the barcode reader 10 and the target barcode 32 is the relatively short distance. When it is determined that the current distance between the barcode reader 10 and the target barcode 32 is the relatively short distance, Step S50 is executed to filter and down-sample the target image. In the embodiment of the present invention down-sampling is performed by simply keeping one pixel between two or among more pixels so as to eliminate unnecessary pixels. For example, even-numbered pixels of the target scanning line 34 are eliminated, or only one pixel is kept among every four pixels to shorten the operation time of the barcode reader 10. Thereafter, moving average filter is used to filter the noise. Assuming that x[n] represents the gray level of the pixel of the target scanning line 34 and y[n] represents the gray level of the pixel after filtering, the moving average filtering is performed according to Formula 2 as shown below.

$$y[n]=(x[n-2]+x[n-1]+x[n]+x[n+1]+x[n+2])/5 \quad \text{Formula 2:}$$

Step S52 is then executed to perform a binarization process on the gray level distribution of the target scanning line 34 according to the predetermined gray level PG so as to decode the target barcode 32.

In the embodiment of the present invention in Table 1, three first predetermined characteristic parameters, three second predetermined characteristic parameters and three third predetermined characteristic parameters correspond to the relatively long distance, the relatively intermediate distance and the relatively short distance, respectively. Three reference characteristic parameters are therefore used to locate the corresponding relative distance from the Look-up Table. The number of the predetermined characteristic parameters and the number of the reference characteristic parameters in the present invention, however, are not so limited. Besides, when a plurality of the reference characteristic parameters, the first predetermined characteristic parameters, the second predetermined characteristic parameters and the third predetermined characteristic parameters are present, the plurality of reference characteristic parameters obtained in Step S34 may not fully fit to the plurality of the first predetermined characteristic parameters, the second predetermined characteristic parameters or the third predetermined characteristic parameters. According the embodiment of the present invention, when the reference characteristic parameters fit to N of the first predetermined characteristic parameters and M of the second predetermined characteristic parameters (wherein both N and M are positive integer), the current distance between the barcode reader 10 and the target barcode 32 is determined as follows. When N is greater than M, the current distance between the barcode reader 10 and the target barcode 32 is determined to be the relatively long distance. When N is smaller than or equal to M, the current distance between the barcode reader 10 and the target barcode 32 is determined to be the relatively intermediate distance. Similarly, when the reference characteristic parameters fits to N of the second predetermined characteristic parameters and M of the third predetermined characteristic parameters, the current distance between the barcode reader 10 and the target barcode 32 is determined to be the relatively intermediate distance or the relatively short distance upon comparison between N and M.

It is to be understood that in the present invention the control logic can be implemented by software design. The software can be executed in the barcode reader or other types of electronic devices with barcode reading function. Of course, each part or function of the aforementioned control logic can be implemented by software, hardware or the combination thereof. Moreover, the control logic of the barcode decoding method according to the present invention can be stored in the computer-readable storage medium, and the instruction data stored in the computer-readable storage medium can be executed by the barcode reader or other types of electronic devices with barcode reading function to generate control commands so as to perform the corresponding functions.

In sum, in the embodiments of the present invention when it is determined that the current distance between the barcode reader and the target barcode is the relatively long distance, the gray level distribution of the target scanning line is divided into at least one bar area and at least one space area. Thereafter, a space is interpolated into the bar area when the corresponding peak point within the gray level region is located within the bar area, and a bar is interpolated into the space area when the corresponding valley point within the gray level region is located within the space area, so as to recover the missing or vague bars or spaces in the target image of the target barcode. By such, the decoding success rate is increased when the current distance between the barcode reader and the target barcode is the relatively long distance. Besides, when the current distance between the barcode reader and the target barcode is determined to be the relatively intermediate distance, the binarization process is performed on the gray level distribution of the target scanning line according to the predetermined gray level PG so as to decode the target barcode. When the current distance between the barcode reader and the target barcode is determined to be the relatively short distance, filtering and down-sampling are performed on the target image, and the binarization process is performed on the gray level distribution of the target scanning line according to the predetermined gray level PG so as to decode the target barcode.

Those skilled in the art will readily observe that numerous modifications and alterations of the method may be made while retaining the teachings of the invention.

What is claimed is:

1. A barcode decoding method, comprising:
    capturing a target image of a target barcode by a barcode reader;
    setting a target scanning line on the target image;
    analyzing a relative relationship between at least two characteristic points of a gray level distribution of the target scanning line to obtain at least one reference characteristic parameter;
    determining a current distance between the barcode reader and the target barcode being a relatively long distance when the at least one reference characteristic parameter fits to at least one first predetermined characteristic parameter;
    dividing the gray level distribution of the target scanning line into at least one bar area and at least one space area according to a predetermined gray level when the current distance is the relatively long distance;
    setting a gray level region according to the predetermined gray level and locating at least one peak point and/or at least one valley point located within the gray level region from the gray level distribution of the target scanning line;
    interpolating a space corresponding to the peak point into the bar area when the peak point is located within the bar area; and
    interpolating a bar corresponding to the valley point into the space area when the valley point is located within the space area.

2. The barcode decoding method of claim 1, further comprising:
    interpolating an interpolation point between every two adjacent pixels for the gray level distribution of the target scanning line;
    wherein a width of the interpolated space is a width between the peak point and the interpolating point adjacent to the peak point, and a width of the interpolated bar is a width between the valley point and the interpolating point adjacent to the valley point.

3. The barcode decoding method of claim 1, wherein the predetermined gray level is an averaged gray level of the gray level distribution of the target scanning line.

4. The barcode decoding method of claim 1, further comprising:
    determining the current distance between the barcode reader and the target barcode being a relatively intermediate distance when the at least one reference characteristic parameter fits to at least one second predetermined characteristic parameter; and
    performing a binarization process on the gray level distribution of the target scanning line according to the predetermined gray level when the current distance is the relatively intermediate distance.

5. The barcode decoding method of claim 4, further comprising:
    determining the current distance between the barcode reader and the target barcode being a relatively short distance when the at least one reference characteristic parameter fits to at least one third predetermined characteristic parameter;
    filtering and down-sampling the target image; and
    performing the binarization process on the gray level distribution of the target scanning line according to the predetermined gray level when the current distance is the relatively short distance.

6. The barcode decoding method of claim 5, further comprising:
    capturing a plurality of template images of a template barcode from a plurality of predetermined distances by the barcode reader, wherein the plurality of predetermined distances comprise the relatively long distance, the relatively intermediate distance and the relatively short distance;
    setting a template scanning line on each of the template images; and
    analyzing a relative relationship between at least two characteristic points of a gray level distribution for each of the template scanning lines to obtain the at least one first predetermined characteristic parameter corresponding to the relatively long distance, the at least one second predetermined characteristic parameter corresponding to the relative intermediate distance and the at least one third predetermined characteristic parameter corresponding to the relatively short distance.

7. The barcode decoding method of claim 1, wherein the relative relationship between the at least two characteristic points is a pixel distance, a gray level difference or a combination thereof.

8. The barcode decoding method of claim 1, wherein the at least two characteristic points are two adjacent peak point and valley points, two adjacent peak points, two adjacent valley points or a combination thereof.

9. The barcode decoding method of claim 4, wherein when the at least one reference characteristic parameter fits to N of the at least one first predetermined characteristic parameter and M of the at least one second predetermined characteristic parameter, the barcode decoding method further comprises:
    determining the current distance being the relatively long distance when N is greater than M; or
    determining the current distance being the relatively intermediate distance when N is smaller than or equal to M, wherein both of N and M are positive integer.

* * * * *